US011790132B2

(12) United States Patent
Cheng et al.

(10) Patent No.: US 11,790,132 B2
(45) Date of Patent: Oct. 17, 2023

(54) CALCULATION METHOD OF EDDY CURRENT LOSS IN MAGNETIC MATERIALS BASED ON MAGNETIC-INDUCTANCE

(71) Applicant: SOUTHEAST UNIVERSITY, Jiangsu (CN)

(72) Inventors: Ming Cheng, Jiangsu (CN); Zheng Wang, Jiangsu (CN); Wei Qin, Jiangsu (CN); Xinkai Zhu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 83 days.

(21) Appl. No.: 17/612,942

(22) PCT Filed: Jan. 22, 2021

(86) PCT No.: PCT/CN2021/073270
§ 371 (c)(1),
(2) Date: Nov. 19, 2021

(87) PCT Pub. No.: WO2022/110529
PCT Pub. Date: Jun. 2, 2022

(65) Prior Publication Data
US 2022/0366106 A1 Nov. 17, 2022

(30) Foreign Application Priority Data
Nov. 26, 2020 (CN) .......................... 202011357024.4

(51) Int. Cl.
*G06F 30/23* (2020.01)
*H01F 41/02* (2006.01)
*G06F 119/06* (2020.01)

(52) U.S. Cl.
CPC ......... *G06F 30/23* (2020.01); *H01F 41/0246* (2013.01); *G06F 2119/06* (2020.01)

(58) Field of Classification Search
CPC ..................................................... G06F 30/23
(Continued)

(56) References Cited

U.S. PATENT DOCUMENTS
2009/0064060 A1 3/2009 Yoshitomi

FOREIGN PATENT DOCUMENTS
CN 103197267 A 7/2013
CN 106326595 A 1/2017
(Continued)

OTHER PUBLICATIONS
Zhu SA et al., "Loss Analysis of a New Low-Speed Direct-Drive Permanent-Magnet Vernier Machine", Jan. 20, 2015, Transactions of China Electrotechnical Society, vol. 30, No. 2, pp. 7.
(Continued)

*Primary Examiner* — Eric D Lee
(74) *Attorney, Agent, or Firm* — MUNCY, GEISSLER, OLDS & LOWE, P.C.

(57) ABSTRACT

The present invention discloses a calculation method of eddy current loss in magnetic materials based on magnetic-inductance. The present invention proposes a vector model of a magnetic circuit, an eddy current reaction is equivalent to a magnetic-inductance component in the magnetic circuit, and the eddy current loss can be fast calculated by the vector model of the magnetic circuit. When the frequency is high, the eddy current loss dominates an iron loss and can be estimated as an entire iron loss. The present invention proposes the vector model of the magnetic circuit based on which the calculation method of eddy current loss in magnetic materials is proposed as well. Through the proposed method the eddy current loss in magnetic materials can be directly calculated by using the magnetic-inductance and the magnetic flux in the magnetic circuit, which can provide (Continued)

guidance for design and performance evaluation of high-frequency electrical equipment from a brand new viewpoint.

4 Claims, 6 Drawing Sheets

(58) Field of Classification Search
USPC ......................................................... 716/115
See application file for complete search history.

(56) References Cited

FOREIGN PATENT DOCUMENTS

| CN | 106326595 | B |   | 1/2017  |            |
|----|-----------|---|---|---------|------------|
| CN | 110399695 | A |   | 11/2019 |            |
| CN | 111062155 | A |   | 4/2020  |            |
| CN | 111104743 | A |   | 5/2020  |            |
| CN | 111566917 | A |   | 8/2020  |            |
| CN | 111581864 | A |   | 8/2020  |            |
| CN | 111931310 | A | * | 11/2020 | G06F 17/13 |
| JP | 2009276117| A |   | 11/2009 |            |
| JP | 2010072773| A |   | 4/2010  |            |

OTHER PUBLICATIONS

Chai, Feng, "Theoretical Analysis and Calculation of Eddy Losses in Stator Windings of Large Synchronous Generator," China Master's Theses Full-text Database (CMFD) Engineering Technology Series II, vol. 3, Mar. 15, 2010, ISSN:1674-0246 C042-24-76 pages, with English abstract.

Zhu, Sa et al., "Loss Analysis of a New Low-Speed Direct-Drive Permanent-Magnet Vernier Machine," Transactions of China Electrotechnical Society, Jan. 25, 2015, vol. 30, No. 2, ISSN:1000-6753, pp. 14-20, with English abstract.

Liu, Yaqing et al., "Calculation method of winding eddy-current losses for high-voltage direct current converter transformers," IET Electric Power Applications, Jul. 31, 2016, vol. 10, No. 2, ISSN:1751-8660, pp. 488-497.

Huang, Yunkai et al., "Development of a high-speed claw pole motor with soft magnetic composite core," IEEE IEMDC 2007: Proceedings of the International Electric Machines and Drives Conference, Jul. 16, 2007, vol. 2, pp. 1564-1568.

Zhu, Sa et al., "Fast Calculation of PM Eddy Current Loss in IPMSM Under PWM VSI Supply Based on the Spectra of Line-Line Voltage," IEEE Transactions on Magnetics, Nov. 30, 2018, , vol. 35, Issue 5, ISSN:0018-9464, pp. 963-971.

* cited by examiner

CALCULATION METHOD OF EDDY CURRENT LOSS IN MAGNETIC MATERIALS BASED ON MAGNETIC-INDUCTANCE

TECHNICAL FIELD

The present invention relates to the field of electromagnetic calculation, in particular, to a calculation method of eddy current loss in magnetic materials.

BACKGROUND

Losses of electrical equipment (such as a motor, a transformer, or a reactor) usually mainly include copper loss and iron loss. For low frequency and low flux density applications, the iron loss takes up a small part, and performance of the equipment is not significantly affected by accuracy of iron loss calculation. However, with the development of the power electronic technology, the rated operating frequency of the electrical equipment such as a high-speed motor or a high-frequency transformer is increasingly high, and the iron loss takes up an increasingly large part, so that accurate calculation of the iron loss is critical to the performance of the electrical equipment. In the classical calculation model for separating the iron loss, the iron loss is considered to mainly include hysteresis loss, eddy current loss, and abnormal loss. There is another opinion that the abnormal loss belongs to the hysteresis loss and that the loss is mainly divided into the hysteresis loss and the eddy current loss. The classical iron loss model describes the mechanism of generating the iron loss, points out that main factors affecting the iron loss are the frequency and the flux density, and considers that the hysteresis loss is directly proportional to the frequency and the eddy current loss is directly proportional to the square of the frequency. When the frequency increases to some extent, the eddy current loss takes up a very large part in the iron loss, so that it is acceptable to replace the entire iron loss with the eddy current loss in an engineering application. Therefore, the fast and accurate estimation of the eddy current loss is significant to research, development and improvement for performance of high-frequency electrical equipment.

Although the model for separating the iron loss can calculate the eddy current loss, the model merely describes the loss of a scalar magnetic field varied sinusoidally. For a magnetic field varied non-sinusoidally, the alternating magnetic field is usually decomposed into a plurality of sinusoidal harmonic components based on the Fourier decomposition, then the loss generated by each harmonic component is calculated by the model of separating the iron loss, and finally all losses are added. The major problem of this method is that the nonlinear feature of the silicon steel sheet itself is not fully considered, thereby leading to an error of the calculated iron loss. Although the dynamic calculation method of iron loss adopted by ANSYS Maxwell can calculate the iron loss of a motor dynamically with the time-stepping finite element, the method adopts a constant eddy current loss coefficient when the eddy current loss is calculated. However, in fact, the eddy current loss coefficient decreases as the frequency increases because of the skin effect, thereby leading to the error of the eddy current loss in different frequencies. The one-dimensional finite element method of calculating the dynamic eddy current loss adopted by JMAG directly solves the distribution of the eddy current field in a silicon steel sheet, and then calculates the eddy current loss. It can be seen from the above analysis description that the present eddy current loss calculation is mostly as follows: Based on the finite element method, the distribution of the magnetic field is first calculated, and the loss is later calculated through post-processing using the model of separating the iron loss or the other models of iron loss calculation. Consequently, the load of calculation is relatively large. Therefore, it is indispensable to study a faster and more accurate method of calculating the eddy current loss.

SUMMARY

The present invention aims to propose a fast calculation method of eddy current loss using a vector model of a magnetic circuit, in which an eddy current reaction is equivalent to a magnetic-inductance component. It is assumed that the eddy current loss almost equals entire iron loss when the frequency is relatively high; since the eddy current loss dominates the total iron loss.

The technical solution proposed in the present invention for the fast eddy current loss calculation is as follows:

The present invention proposes a calculation method of eddy current loss in magnetic materials, where an eddy current reaction is equivalent to a lumped parameter magnetic-inductance $L_{mc}$, then a vector model $\dot{F}=\dot{\Phi}\cdot(R_{mc}+j\omega L_{mc})$ of a magnetic circuit is established, where j is an imaginary unit, $R_{mc}$ is a reluctance of the magnetic circuit, ω is an angular frequency of a magnetic flux varied in the magnetic circuit, $\dot{\Phi}$ is a magnetic flux vector in the magnetic circuit, and $\dot{F}$ is a magnetomotive force (MMF) vector in the magnetic circuit; and the calculation method of eddy current loss in magnetic materials includes the following steps:

S1, an excitation voltage $\dot{U}_E$ with a frequency of $f_1$ is applied to an excitation coil, generating an excitation current $\dot{I}_E$, an induced voltage $\dot{U}_D$ is induced on a detection coil, and active power P input to the excitation coil can be observed by a power analyzer;

S2, a magnetic flux $\dot{\Phi}$ and a flux density B can be obtained through a relationship $\dot{\Phi}=\dot{U}_D/(2\pi f N_2)$, where $N_2$ is the number of turns of the detection coil;

S3, a magnetic-inductance $L_{mc\_1}$ of the magnetic circuit with the frequency of $f_1$ can be derived by the input active power observed in S1 and a relationship formula of $P=\omega^2 L_{mc}\|\dot{\Phi}\|^2$;

S4, the magnetic fluxes corresponding to the different excitation voltages can be obtained in S2 by keeping the frequency of the excitation voltage unchanged while changing amplitude of the excitation voltage $\dot{U}_E$; and then the eddy current losses with the different magnetic fluxes can be calculated by the relationship formula of $P=\omega^2 L_{mc}\|\dot{\Phi}\|^2$; and S5, a magnetic-inductance $L_{mc\_2}$ with the frequency of $f_2$ in the magnetic circuit can be obtained according to a formula $$\frac{L_{mc\_1}}{L_{mc\_2}} = \sqrt{\frac{f_2}{f_1}},$$

therefore, when the frequency of the excitation voltage is adjusted to $f_2$, then the eddy current losses with the different magnetic fluxes can be obtained as well according to the relationship formula of $P=\omega^2 L_{mc}\|\dot{\Phi}\|^2$.

Further, according to the calculation method of eddy current loss in magnetic materials proposed by the present invention, virtual magnetic power $\dot{S}_{mc}$ of the vector model of the magnetic circuit is further derived by multiplying the MMF with a magnetic flux, as follows:

$$\dot{S}_{mc} = \dot{\Phi} \cdot \dot{F}^* = \dot{\Phi} \cdot [R_{mc} \cdot \dot{\Phi}^* - j\omega L_{mc} \dot{\Phi}^*] = R_{mc} \|\dot{\Phi}\|^2 - j\omega L_{mc} \|\dot{\Phi}\|^2.$$

Further, according to the calculation method of eddy current loss in magnetic materials proposed by the present invention, the virtual magnetic power and electric power are connected through a conversion factor jω, satisfying the following relationship:

$$\dot{S}_e = j\omega \dot{S}_{mc} \|\dot{\Phi}\|^2 + j\omega R_{mc} \|\dot{I}\|^2,$$

where a real part is active power, and an imaginary part is reactive power.

Further, according to the calculation method of eddy current loss in magnetic materials proposed by the present invention, the power consumed by the magnetic-inductance in the magnetic circuit corresponds to the power of the eddy current loss, therefore, the eddy current loss can be directly calculated by the magnetic-inductance and the magnetic flux in the magnetic circuit, as follows:

$$P_{eddy} = \omega^2 L_{mc} \|\dot{\Phi}\|^2.$$

The present invention owns the following benefits:
1. The effect of the eddy current reaction on the magnetic field distribution is considered in a magnetic field calculation process, thereby the calculation accuracy of the magnetic field calculation is improved. The eddy current reaction is equivalent to a lumped parameter "magnetic-inductance", so the existing scalar model of magnetic circuit can be modified into a vector model, which proposes a new thought for the analytical calculation and the finite element calculation of the magnetic field.
2. After the vector model of the magnetic circuit is established, the eddy current loss can be fast calculated in the proposed magnetic circuit, which can improve the design efficiency in the initial phase of the electrical equipment.

DETAILED DESCRIPTION

The technical solutions of the present invention will be described below in detail with the accompanying drawings.

Figure 1:
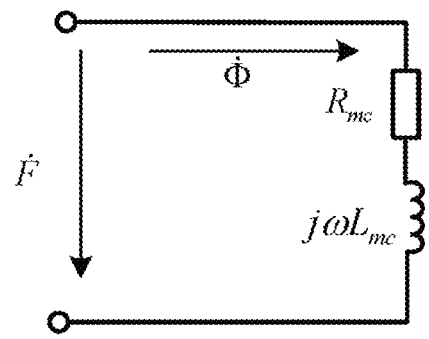
FIG. 1 is a schematic diagram of a vector model of a magnetic circuit proposed in the present invention.
Figure 2:
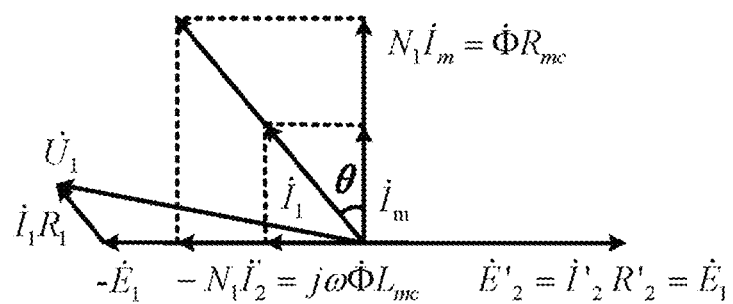
FIG. 2 is a phasor diagram of each parameter of a vector model of a magnetic circuit proposed in the present invention.

The present invention proposes a calculation method of eddy current loss in magnetic materials. An eddy current reaction is equivalent to a lumped parameter "magnetic-inductance" denoted as $L_{mc}$ in a magnetic circuit model, which is in analogy to inductance denoted as L in an electric circuit model. Based on this, a vector model of a magnetic circuit is proposed, as shown in FIG. 1. The vector model of the magnetic circuit is in analogy to the electric circuit model in a vector form, and the specific analogy process is as follows: An MMF of the magnetic circuit is in analogy to a controllable voltage of the electric circuit, a reluctance of the magnetic circuit is in analogy to a resistance of the electric circuit, a magnetic-inductance of the magnetic circuit is in analogy to the inductance of the electric circuit, and a magnetic flux passing through the magnetic circuit is in analogy to a current passing through the electric circuit. As shown in FIG. 2, a mathematical expression of a relationship among the MMF $\dot{F}$, the magnetic flux $\dot{\Phi}$, the reluctance $R_{mc}$, and the magnetic-inductance $L_{mc}$ of the magnetic circuit is in consistent with a mathematical expression of a relationship among the voltage $\dot{U}$, the current $\dot{I}$, the resistance R, and the inductance L of the electric circuit. A mathematical expression of the power and energy calculated by using the magnetic circuit is also in consistent with a mathematical expression of the power and energy calculated through the electric circuit, and the two mathematical expressions may be converted into each other. The power or energy of the iron loss caused by the eddy current reaction in a magnetic material equals to the power or energy consumed by the magnetic-inductance of the magnetic circuit.

The specific implementation of the present invention includes the following steps:
S1, an excitation voltage $\dot{U}_E$ with a frequency of $f_1$ is applied to an excitation coil, generating an excitation current $\dot{I}_E$, an induced voltage $\dot{U}_D$ is induced on a detection coil, and active power P input to the excitation coil can be observed by a power analyzer;

S2, a magnetic flux $\dot{\Phi}$ and a flux density B can be obtained through a relationship $\dot{\Phi} = \dot{U}_D/(2\pi f N_2)$, where $N_2$ is the number of turns of the detection coil;

S3, a magnetic-inductance $L_{mc\_1}$ of the magnetic circuit with the frequency of $f_1$ can be derived by the input active power observed in S1 and a relationship formula of $P = \omega^2 L_{mc} \|\dot{\Phi}\|^2$;

S4, the magnetic fluxes corresponding to the different excitation voltages can be obtained in S2 by keeping the frequency of the excitation voltage unchanged while changing amplitude of the excitation voltage $\dot{U}_E$; and then the eddy current losses with the different magnetic fluxes can be calculated by the relationship formula of $P = \omega^2 L_{mc} \|\dot{\Phi}\|^2$; and S5, a magnetic-inductance $L_{mc\_2}$ with the frequency of $f_2$ in the magnetic circuit can be obtained according to a formula $$\frac{L_{mc\_1}}{L_{mc\_2}} = \sqrt{\frac{f_2}{f_1}},$$

therefore, when the frequency of the excitation voltage is adjusted to $f_2$, then the eddy current losses with the different magnetic fluxes can be obtained as well according to the relationship formula of $P = \omega^2 L_{mc} \|\dot{\Phi}\|^2$.

The magnetic-inductance $L_{mc}$ of the vector model of the magnetic circuit has the feature of inhibiting the alternating magnetic flux and passing the direct magnetic flux, which is in analogy to that the inductance of the electric circuit inhibits the alternating current and passes the direct current.

The magnetic-inductance $L_{mc}$ may change the magnitude and the phase of the alternating magnetic flux in the magnetic circuit, which is in analogy to that inductance may change the magnitude and the phase of the alternating current in the electric circuit. The influence degree of the magnetic-inductance on the alternating magnetic flux can be featured by a physical quantity named as magnetic reactance, a vector, denoted as $\dot{X}_{mc}$. A relationship between the reactance and the magnetic-inductance can be expressed as $\dot{X}_{mc}=j\omega L_{mc}$.

A relationship among the MMF, the reluctance, and the magnetic-inductance of the vector model of the magnetic circuit and the magnetic flux can be summarized as $\dot{F}=\dot{\Phi}\cdot(R_{mc}+j\omega L_{mc})$ in the vector model of the magnetic circuit, and the angle between the MMF and the magnetic flux is $$\theta = \arctan\left(\frac{\omega L_{mc}}{R_{mc}}\right).$$

Virtual magnetic power in the vector model of the magnetic circuit is directly calculated by multiplying the MMF with the magnetic flux, which is in analogy to that the electric power in the electric circuit is calculated by multiplying the voltage with the current, as follows:

$$\dot{S}_{mc}=\dot{\Phi}\cdot\dot{F}^*=\dot{\Phi}\cdot[R_{mc}\cdot\dot{\Phi}^*-j\omega L_{mc}\dot{\Phi}^*]=R_{mc}\|\dot{\Phi}\|^2-j\omega L_{mc}\|\dot{\Phi}\|^2.$$

Further, a real part of the virtual magnetic power represents the power consumed by the reluctance, and an imaginary part thereof represents the power consumed by the magnetic-inductance.

Further, the virtual magnetic power $\dot{S}_{mc}$ and the electric power $\dot{S}_e$ from the perspective of the electric circuit may be converted into each other, and satisfy a relationship $\dot{S}_e=j\omega\dot{S}_{mc}=\omega^2 L_{mc}\|\dot{\Phi}\|^2+j\omega R_{mc}\|\dot{\Phi}\|^2$, in which the real part is the active power in the electric circuit and the imaginary part is reactive power in the electric circuit.

Further, the interconversion relationship between the virtual magnetic power $\dot{S}_{mc}$ and the electric power $\dot{S}_e$ may be explained in details as follows: The power consumed by the magnetic-inductance of the magnetic circuit is obtained by dividing the active power in the electric circuit by $\omega$, and the power consumed by the reluctance of the magnetic circuit is obtained by dividing the reactive power in the electric circuit by $\omega$.

The magnetic-inductance is an equivalent lumped parameter of the eddy current reaction in magnetic materials, and the power of the eddy current loss can be obtained by multiplying the power consumed by the magnetic-inductance of the magnetic circuit with $\omega$.

Further, for the eddy current loss in magnetic materials in electrical equipment the eddy current loss can be fast calculated as long as the vector model of the magnetic circuit of the electric equipment is built to obtain the magnetic flux and the magnetic-inductance.

Further, for simple electric equipment, its lumped parameter magnetic circuit vector model can be directly established, while for complex electrical equipment, the entire has to be divided into many relatively small regions, then a magnetic network model with many vector magnetic components will be built.

Figure 3:
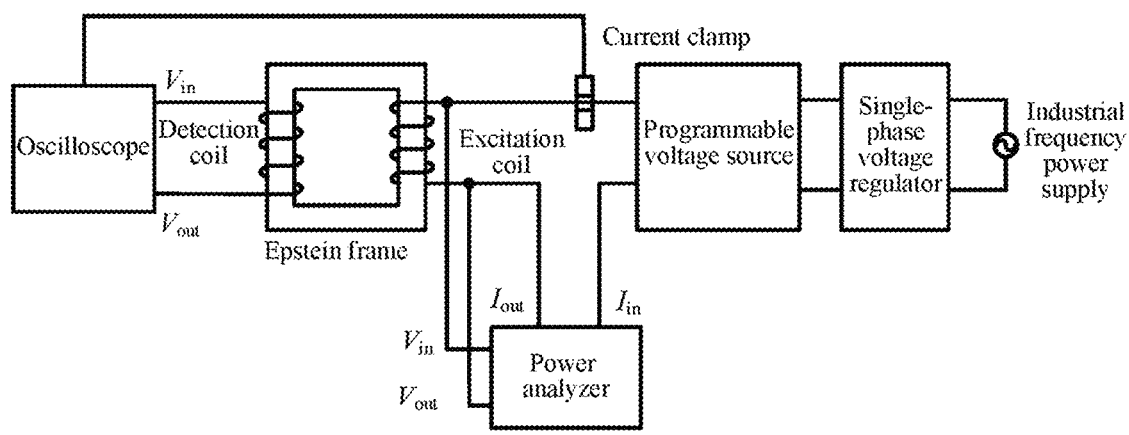
FIG. 3 is a schematic diagram of an experiment platform for verifying a calculation method of eddy current loss in magnetic materials proposed in the present invention.
Figure 4:
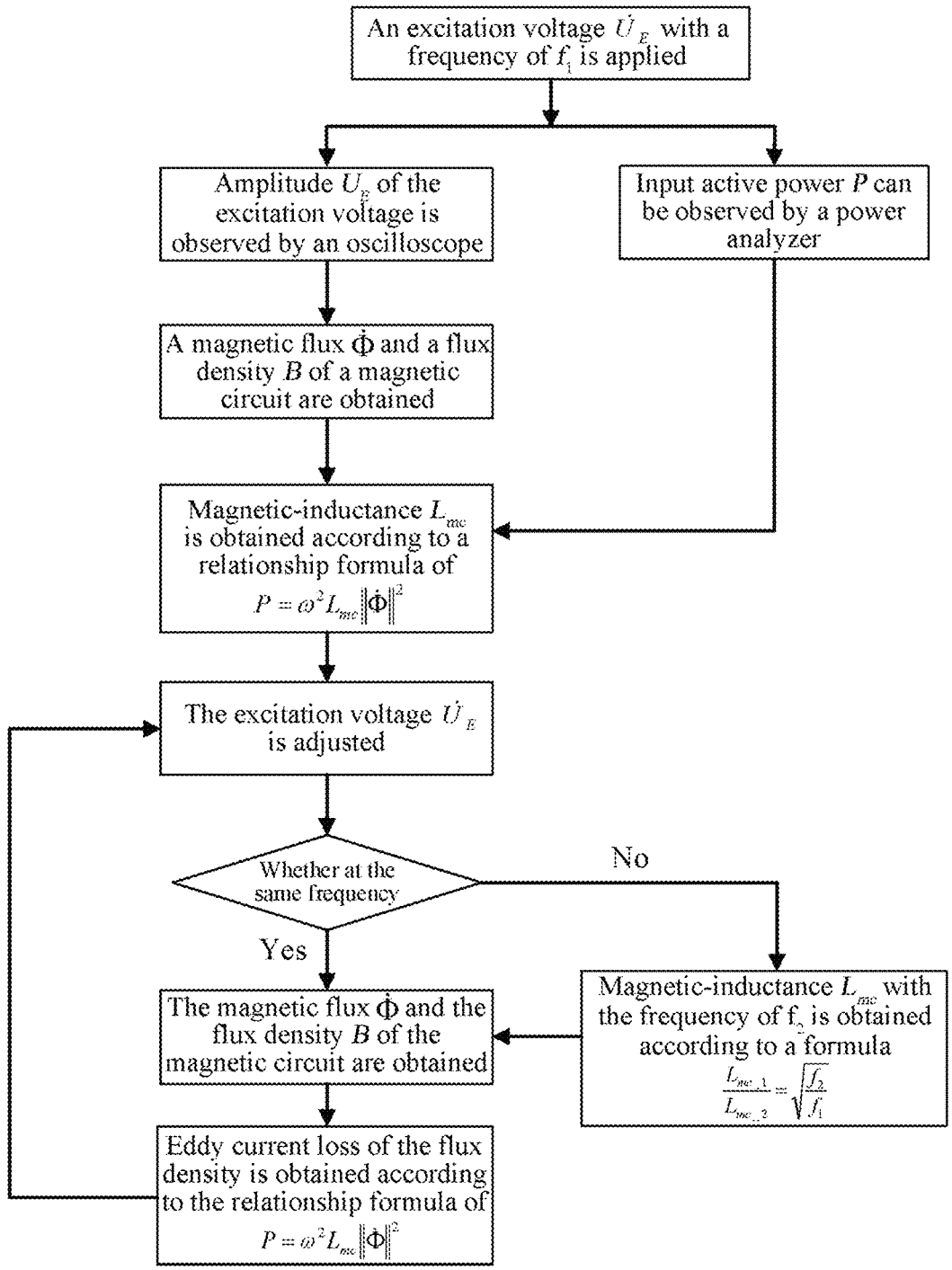
FIG. 4 is a flowchart of eddy current loss calculation in magnetic materials proposed in the present invention.
Figure 5:
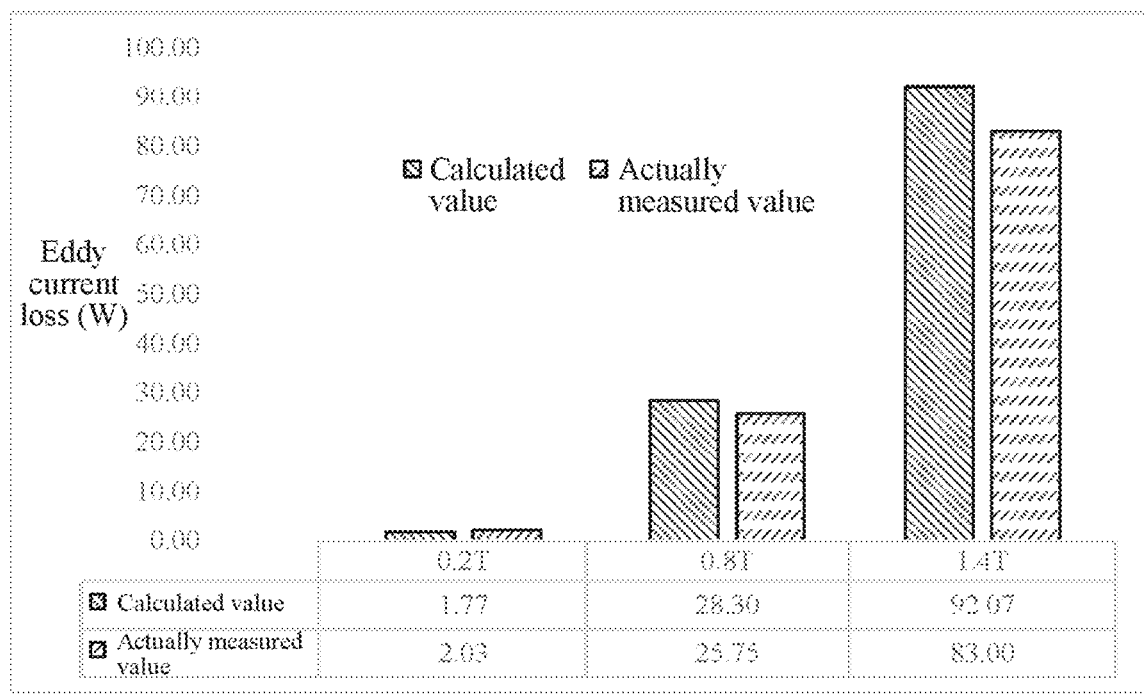
FIG. 5 is a diagram of comparison of the eddy current loss in magnetic materials calculated by the present invention with actually measured eddy current loss at 400 Hz.

FIG. 3 is a schematic diagram of an experiment platform for verifying a calculation method of eddy current loss, which mainly includes a programmable alternating power supply, an Epstein frame, a power analyzer, and an oscilloscope. The calculation flowchart of the proposed method is shown in FIG. 4. The excitation voltage of 400 Hz may be input to the excitation coil by the programmable alternating power supply, the excitation voltage is adjusted to make the flux density of an iron core 0.5 T (any flux density), then the magnetic flux $\|\dot{\Phi}\|$ of the iron core may be obtained, and the active power P input in this case is observed by the power analyzer. The magnetic-inductance $L_{mc\_400}$ of the iron core at 400 Hz is derived based on the real part of $\dot{S}_e=j\omega\dot{S}_{mc}=\omega^2 L_{mc}\|\dot{\Phi}\|^2+j\omega R_{mc}\|\dot{\Phi}\|^2$. The magnetic-inductance keeps unchanged under the same frequency but the different flux densities. The excitation voltage is adjusted to make flux densities of the iron core be 0.2 T, 0.8 T, and 1.4 T respectively, then the corresponding magnetic flux through the iron core can be obtained, respectively. The calculation expression $P_{eddy}=\omega^2 L_{mc}\|\dot{\Phi}\|^2$ of the eddy current loss in the vector model of the magnetic circuit is applied, the eddy current loss at 400 Hz is calculated when the flux densities are 0.2 T, 0.8 T, and 1.4 T respectively, by the expression $P_{eddy}=\omega^2 L_{mc}\|\dot{\Phi}\|^2$, FIG. 5 compares the eddy current loss obtained by the above expression with the eddy current loss obtained by the power analyzer removing the copper loss of the excitation coil. The alternating power supply is adjusted and the excitation voltage of 600 Hz is applied to the excitation coil, making the magnetic flux densities of the iron core be 0.2 T, 0.8 T, and 1.4 T respectively, then the corresponding magnetic fluxes of the iron core can be obtained again. The magnetic-inductance is a physical quantity related to the resistance. Due to the skin effect, the resistance will change when the frequency changes, consequently, the magnetic-inductance has to change accordingly. When the magnetic flux density keeps same, the relationship between the magnetic-inductance and the frequency can be derived by the magnetic-inductance $L_{mc\_400}$ at 400 Hz, using $$L_{mc\_600} = \sqrt{\frac{2}{3}} L_{mc\_400}.$$

Figure 6:
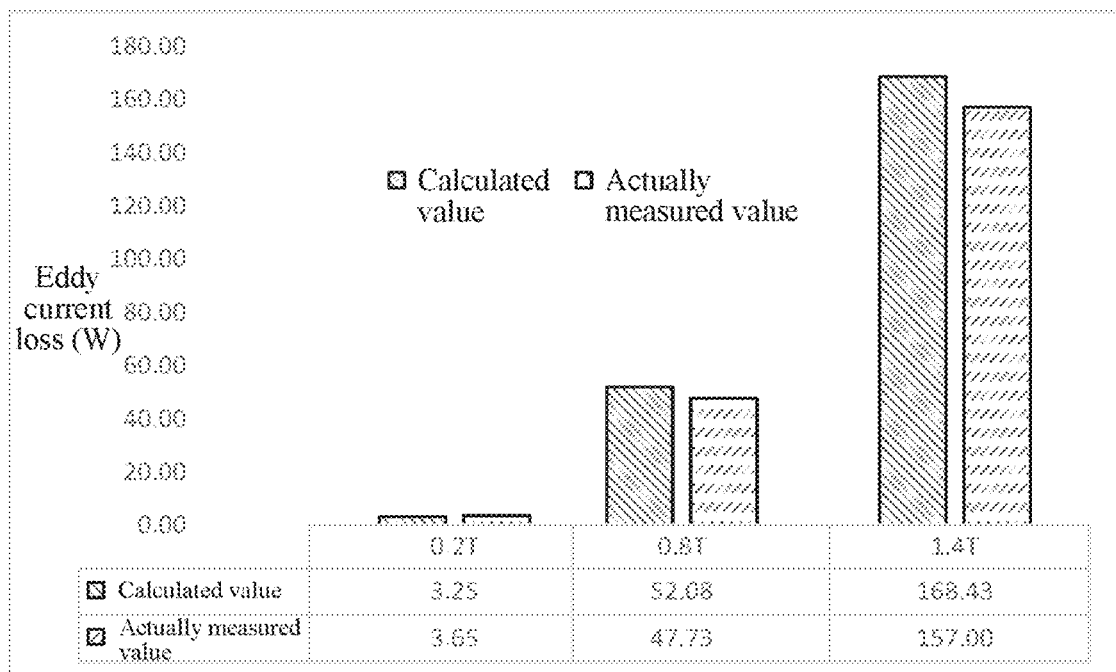
FIG. 6 is a diagram of comparison of the eddy current loss in magnetic materials calculated by the present invention with actually measured eddy current loss at 600 Hz.

Similarly, the eddy current loss at 600 Hz can also be obtained when the flux densities are 0.2 T, 0.8 T, and 1.4 T respectively. The eddy current losses are obtained by different methods are shown in FIG. 6.

In conclusion, the present invention proposes a calculation method of eddy current loss in magnetic materials based on the vector model of the magnetic circuit. The foregoing descriptions are merely exemplary embodiments of the present invention, but are not intended to limit the protection scope of the present invention. Any equivalent modification or alteration by a person of ordinary skill in the art according to the present invention shall fall within the protection scope recorded in the claims.

What is claimed is:

1. A calculation method of eddy current loss in magnetic materials, wherein an eddy current reaction is equivalent to a lumped parameter magnetic-inductance $L_{mc}$, then a vector model $\dot{F}=\dot{\Phi}\cdot(R_{mc}+j\omega L_{mc})$ of a magnetic circuit is established, wherein j is an imaginary unit, $R_{mc}$ is a reluctance of the magnetic circuit, $\omega$ is an angular frequency of a magnetic flux varied in the magnetic circuit, $\dot{\Phi}$ is a magnetic flux vector in the magnetic circuit, and $\dot{F}$ is a magnetomotive force (MMF) vector in the magnetic circuit; and the calculation method of eddy current loss in magnetic materials comprises the following steps:

S1, an excitation voltage $\dot{U}_E$ with a frequency of $f_1$ is applied to an excitation coil, generating an excitation current $\dot{I}_E$, an induced voltage $\dot{U}_D$ is induced on a detection coil, and active power P input to the excitation coil can be observed by a power analyzer;

S2, the magnetic flux vector $\dot{\Phi}$ and a flux density B can be obtained through a relationship $\dot{\Phi}=\dot{U}_D/(2\pi f_1 N_2)$, wherein $N_2$ is the number of turns of the detection coil;

S3, a magnetic-inductance $L_{mc\_1}$ of the magnetic circuit with the frequency of $f_1$ can be derived by the input active power observed in S1 and a relationship formula of $P=\omega^2 L_{mc}\|\dot{\Phi}\|^2$;

S4, magnetic fluxes corresponding to different excitation voltages can be obtained in S2 by keeping the frequency of the excitation voltage unchanged while changing amplitude of the excitation voltage $\dot{U}_E$; and then the eddy current losses with the different magnetic fluxes can be calculated by the relationship formula of $P=\omega^2 L_{mc}\|\dot{\Phi}\|^2$; and S5, a magnetic-inductance $L_{mc\_2}$ with a frequency $f_2$ in the magnetic circuit can be obtained according to a formula $$\frac{L_{mc\_1}}{L_{mc\_2}} = \sqrt{\frac{f_2}{f_1}},$$

therefore, when the frequency of the excitation voltage is adjusted to $f_2$, then the eddy current losses with the different magnetic fluxes can be obtained as well according to the relationship formula of $P=\Phi^2 L_{mc}\|\dot{\Phi}\|^2$.

2. The calculation method of eddy current loss in magnetic materials according to claim 1, wherein virtual magnetic power $\dot{S}_{mc}$ of the vector model of the magnetic circuit is further derived by multiplying the MMF with the magnetic flux, as follows:

$$\dot{S}_{mc}=\dot{\Phi}\cdot\dot{F}^*=\dot{\Phi}\cdot[R_{mc}\cdot\dot{\Phi}^*-j\omega L_{mc}\dot{\Phi}^*]=R_{mc}\|\dot{\Phi}\|^2 j\omega L_{mc}\|\dot{\Phi}\|^2.$$

3. The calculation method of eddy current loss in magnetic materials according to claim 2, wherein the virtual magnetic power $\dot{S}_{mc}$ and electric power $\dot{S}_e$ are connected through a conversion factor $j\omega$, satisfying the following relationship:

$$\dot{S}_e=j\omega\dot{S}_{mc}\|\dot{\Phi}\|^2+j\omega R_{mc}\|\|\|^2,$$

wherein a real part is active power, and an imaginary part is reactive power.

4. The calculation method of eddy current loss in magnetic materials according to claim 1, wherein the power consumed by magnetic-inductance in the magnetic circuit corresponds to the power of the eddy current loss $P_{eddy}$, therefore, the eddy current loss $P_{eddy}$ can be directly calculated by the magnetic-inductance and the magnetic flux in the magnetic circuit, as follows:

$$P_{eddy}=\omega^2 L_{mc}\|\dot{\Phi}\|^2.$$

* * * * *